United States Patent
Hattori et al.

(10) Patent No.: US 7,297,730 B2
(45) Date of Patent: Nov. 20, 2007

(54) BALLPOINT-PEN INK COMPOSITIONS

(75) Inventors: Tetsuya Hattori, Nagoya (JP);
Katsuhisa Asada, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 257 days.

(21) Appl. No.: 10/680,254

(22) Filed: Oct. 8, 2003

(65) Prior Publication Data
US 2005/0096410 A1 May 5, 2005

(51) Int. Cl.
*C09D 11/18* (2006.01)
*C08L 33/08* (2006.01)
*C08L 33/10* (2006.01)
*C08L 33/12* (2006.01)
*C08L 33/02* (2006.01)

(52) U.S. Cl. ......................... 523/161; 524/556; 524/560

(58) Field of Classification Search ................ 523/160, 523/161
See application file for complete search history.

(56) References Cited

U.S. PATENT DOCUMENTS

| | | | |
|---|---|---|---|
| 4,786,198 A * | 11/1988 | Zgambo | 401/142 |
| 5,354,593 A * | 10/1994 | Grandmont et al. | 428/137 |
| 5,769,931 A * | 6/1998 | Wang et al. | 106/31.38 |
| 6,048,914 A * | 4/2000 | Goto et al. | 523/161 |
| 6,299,676 B1 * | 10/2001 | Saikatsu et al. | 106/31.77 |
| 6,406,204 B1 * | 6/2002 | Omatsu et al. | 401/142 |
| 6,479,568 B1 * | 11/2002 | Fujii et al. | 523/161 |
| 6,590,012 B2 * | 7/2003 | Miyabayashi | 523/160 |
| 6,663,704 B2 * | 12/2003 | Spencer et al. | 106/31.9 |
| 2004/0170587 A1 * | 9/2004 | Vondruska | 424/70.12 |

FOREIGN PATENT DOCUMENTS

JP 63-309571 A1 12/1988

* cited by examiner

*Primary Examiner*—Callie Shosho
(74) *Attorney, Agent, or Firm*—Rader, Fishman & Grauer PLLC

(57) ABSTRACT

An ink composition useful in an oil-based ballpoint pen capable of drawing a satisfactory line on the surfaces of various materials to be written which are not only papers but also non-permeable materials such as glasses and plastics as well as fibrous materials such as fabrics is provided. Such a ink composition comprises a colorant, an organic solvent having a vapor pressure of 5.0 to 50 mmHg (20° C.) as a main solvent, such as n-propyl alcohol, isopropyl alcohol and propylene glycol monomethyl ether and a shear-viscosity reducing agent.

3 Claims, 6 Drawing Sheets

BALLPOINT-PEN INK COMPOSITIONS

FIELD OF THE INVENTION

The present invention relates to a ballpoint-pen ink composition. More specifically, the invention relates to a ballpoint-pen ink composition capable of drawing a satisfactory line on the surfaces of various materials to be written, the materials are papers, non-permeable materials and fibrous materials.

BACKGROUND OF THE INVENTION

In general, a ballpoint pen employing an oil-based ink conventionally has a simple structure installing in its holder a ballpoint-pen refill having a ball-holding metal tip engaged with one end of the ink reservoir tube.

While an oil-based ballpoint pen having a structure described above can be provided at a low price, it should be constructed in such a manner that the gap between the ball and the tip should be reduced in order to avoid the drip of the ink via the gap of the ball and the tip when the tip is in a downward direction, i.e., when the pen stands on its head, and it also should have an ink whose viscosity at ambient temperature which is as high as thousands to ten thousands mPa·s. Accordingly, it has a heavy touch upon drawing, and tends to exhibits a pale line. Also in order to avoid the blurred line due to the evaporation of an organic solvent from the pen tip, the organic solvent should be one that has a high boiling point and is difficult to be evaporated.

While a conventional ink for a ballpoint pen is intended to be used in writing on the surface of a paper and has no practical problems with regard to the dryness of a drawn line because of the permeation of the organic solvent in the ink into the internal region of the paper, it poses a problem such as a deposition of a still-wet ink onto a hand or a dirt on a non-written blank on the paper upon touching the drawn line with a hand due to no permeation of the organic solvent when it is drawn on a non-permeable material.

Also while it was attempted to reduce the viscosity of an ink for the purpose of obtaining a light pen touch and an intensely colored line, no sufficient performance was obtained in the drawing on a non-permeable material described above (JP-A-63-309571).

SUMMARY OF THE INVENTION

Now we found, in an effort to overcome the problems associated with a conventional oil-based ink for a ballpoint pen described above, that by containing at least a colorant, an organic solvent as a main solvent whose vapor pressure is about 665 to 6650 Pa (5.0 to 50 mmHg) (20° C.) and a shear-viscosity reducing agent an ink composition for a ballpoint pen capable of drawing a satisfactory line on the surfaces not only of papers but also of non-permeable materials such as glasses and plastics as well as fibrous materials such as fabrics can be provided.

One embodiment of the invention is a ballpoint-pen ink composition comprising at least a colorant, an organic solvent as a main solvent whose vapor pressure is 5.0 to 50 mmHg (20° C.) and a shear-viscosity reducing agent. In preferred embodiments, said organic solvent is one or more solvents selected from alcohols, glycol ethers and hydrocarbons, said organic solvent is selected from n-propyl alcohol, isopropyl alcohol and propylene glycol monomethyl ether, and the ink viscosity at the shear speed of 3.84 $S^{-1}$ is about not less than 10 mPa·s (20° C.) and the shear-viscosity reduction index is about 0.3 to 0.99.

In the present invention, by using as a main solvent an organic solvent whose vapor pressure at 20° C. is about 5.0 to 50 mmHg and which thus is readily evaporated, the dryness of a drawn line is excellent even when the line is drawn on a non-permeable material such as a glass or a plastic.

An organic solvent whose vapor pressure at 20° C. is about 5.0 to 50 mmHg may for example be an alcoholic organic solvent such as ethyl alcohol (45), n-propyl alcohol (14.5), isopropyl alcohol (32.4), n-butyl alcohol (5.5), isobutyl alcohol (8.9), s-butyl alcohol (12.7), t-butyl alcohol (30.6), t-amyl alcohol (13.0) and the like, a glycol ether-based organic solvent such as ethylene glycol monomethyl ether (8.5), ethylene glycol diethyl ether (9.7), ethylene glycol monoisopropyl ether (6.0), propylene glycol monomethyl ether (7.6) and the like, a hydrocarbon-based organic solvent such as n-heptane (35.0), n-octane (11.0), isooctane (41.0), methylcyclohexane (37.0), ethylcyclohexane (10.0), toluene (24.0), xylene (5.0 to 6.0), ethylbenzene (7.1) and the like, a ketone-based organic solvent such as methyl isobutyl ketone (16.0), methyl n-propyl ketone (12.0), methyl n-butyl ketone (12.0), di-n-propyl ketone (5.2) and the like, an ester-based organic solvent such as n-butyl formate (22.0), isobutyl formate (33.0), n-propyl acetate (25.0), isopropyl acetate (48.0), n-butyl acetate (8.4), isobutyl acetate (13.0), ethyl propionate (28.0), n-butyl propionate (45.0), methyl butyrate (25.0), ethyl butyrate (11.0) and the like.

The value in each bracket is the vapor pressure of the respective solvent at 20° C.

Among the organic solvents described above, those employed preferably are selected from alcohols, glycol ethers and hydrocarbons, and n-propyl alcohol and isopropyl alcohol among the alcohols and propylene glycol monomethyl ether among the glycol ethers being employed preferably because of the excellent solubilities of various resins and additives employed simultaneously.

Any of the organic solvents described above is employed in an amount of 50% or more by weight in the solvents.

Two or more of the solvents described above may be employed in combination.

Any other solvent having a vapor pressure less than 5.0 mmHg (665 Pa) or exceeding 50 mmHg (6650 Pa) may be added if desired, such as benzyl alcohol, ethylene glycol, diethylene glycol, propylene glycol, benzyl glycol, ethylene glycol monobutyl ether, ethylene glycol monohexyl ether, ethylene glycol monophenyl ether, diethylene glycol monoethyl ether, diethylene glycol monophenyl ether, propylene glycol monoethyl ether, propylene glycol monophenyl ether, dipropylene glycol monoethyl ether, dipropylene glycol monophenyl ether, tripropylene glycol monomethyl ether, tripropylene glycol monoethyl ether, tripropylene glycol monophenyl ether, methyl lactate, ethyl lactate, γ-butyrolactone and the like.

The ink composition for a ballpoint pen also contains a shear-viscosity reducing agent.

By adding such a shear-viscosity reducing agent, the leakage of ink via a gap between a ball and a tip when the pen is not used can be avoided, and the follower of the ink when the pen is allowed to stand with its tip up (normal standing position) can also be avoided.

The ink composition for a ballpoint pen has a ink viscosity measured at 20° C. by a type E viscometer at the shear speed of 3.84 S⁻1 of not less than about 10 mPa·s (20° C.), preferably about 10 to 1000 mPa·s (20° C.), preferably with the shear-viscosity reduction index being about 0.3 to 0.99, more preferably about 0.5 to 0.99.

By exhibiting the range of a viscosity and a shear-viscosity reduction index within the ranges specified above, the prevention of the leakage and the follower of the ink can further be ensured.

When a pigment is employed as a colorant, the aggregation or sedimentation of the pigment can be suppressed.

An ink viscosity less than about 10 mPa·s gives an inappropriate effect of the shear-viscosity reducing agent, which may affect the ink supply performance or the drawing performance.

A shear-viscosity reduction index (n) mentioned above is a value calculated from the values obtained by a hydrokinetic measurement using a viscometer such as a shearing stress value (T) and a shearing speed value (j) on the basis of an experimental equation $T=Kj^n$ wherein K is a non-Newton viscosity coefficient.

As the shear-viscosity reducing agent described above may be any known compound.

Examples of the shear-viscosity reducing agents are listed below.

1) Crosslinked acrylic resins and emulsions thereof, crosslinked N-vinyl carboxylic acid amide polymers or copolymers.

2) Non-crosslinked N-vinyl carboxylic acid amide polymers or copolymers and emulsions thereof.

3) Hydrogenated castor oils.

4) Waxes such as fatty acid amide waxes, oxidized polyethylene waxes and the like.

5) Fatty acid metal salts such as aluminium stearate, aluminium palmitate, aluminium octylate, aluminium laurate and the like.

6) Other organic compounds such as dibenzylidene sorbitol, dextrin fatty acid esters, N-acylamino acid-based compounds and the like.

7) Clay based inorganic compounds such as smectites (montmorillonites), bentonites, hectorites, silica and the like.

8) Non crosslinked Acrylic copolymers of including polymeric chain units represented by Formula (1) and by Formula (2) respectively:

(Formula 1)

(Formula 2)

wherein $R_1$ is an alkyl group having 1 to 12 carbon atoms, $R_2$ is an alkyl group having 1 to 24 carbon atoms, and m and n represent polymerization degrees of thousands to hundred thousands.

These non-crosslinked acrylic copolymers may be employed in an amount of about 0.1 to 10% by weight based on an ink composition when the solvents selected from alcohols and glycol ethers.

9) Another non-crosslinked acrylic copolymers of acrylic acid or methacrylic acid with acrylates represented by Formula (3) or methacrylates reprensented by Formula (4):

(Formula 3)

[wherein $R_1$ is an alkyl group having 1 to 12 carbon atoms]

(Formula 4)

[wherein $R_2$ is an alkyl group having 1 to 12 carbon atoms].

These non-crosslinked acrylic copolymers may be employed in an amount of about 0.1 to 10% by weight based on an ink composition when the solvents selected from alcohols and glycol ethers.

Since the blurring of a drawn line can be suppressed by adding a shear-viscosity reducing agent described above, the drawn line is satisfactorily formed without blurring not only on a paper but also on a highly permeable material such as a fibrous material including a fabric.

Examples of a solvent dye mentioned above is:

VARIFAST Black 3806 (C.I. Solvent Black 29), 3807 (trimethylbenzylammonium salt of C.I. Solvent Black 29), Spirit Black SB (C.I. Solvent Black 5), SPIRON Black GMH (C.I. Solvent Black 43), VARIFAST Red 1308 (salt forming form of C.I. Basic Red 1 dye and C.I. Acid Yellow 23 dye), VARIFAST Yellow AUM (salt forming form of C.I. Basic Yellow 2 dye and C.I. Acid Yellow 42 dye), SPIRON Yellow C2 GH (organic acid salt of C.I. Basic Yellow 2), SPIRON Violet CRH (C.I. Solvent Violet 8-1), VARIFAST Violet 1701 (salt forming form of C.I. Basic Violet 1 and C.I. Acid Yellow 42 dye), SPIRON Red CGH (organic acid salt of C.I. Basic Red 1), SPIRON Pink BH (C.I. Solvent Red 82), Nigrosine Base EX (C.I. Solvent Black 7), Oil Blue 613 (C.I. Solvent Blue 5), Neozapon Blue 808 (C.I. Solvent Blue 70) and the like.

A pigment may for example be an inorganic pigment such as a carbon black, ultramarine and titanium dioxide pigment, an organic pigment such as an azo-based pigment, phthalocyanine-based pigment, indigo pigment, thioindigo pigment, thren pigment, quinacridone-based pigment, anthraquinone-based pigment, thron-based pigment, diketopyrrolopyrrole-based pigment, dioxazine-based pigment, perylene-based pigment, perinone-based pigment and isoindolinone-based pigment, a metal pigment such as an aluminium powder or aluminium powder whose surface is treated with a colored resin, a metal gloss pigment obtained by forming a metal vapor deposition film such as that of aluminium on a transparent or colored transparent film, a metal pigment having a thickness of 0.01 to 0.1 μm obtained by peeling a metal vapor deposition film such as that of aluminium formed on a substrate such as a film, a colloidal particle having a mean particle size of 5 to 30 nm selected from gold, silver, platinum and copper, a fluorescent pigment, light-storing pigment, pearl pigment obtained by coating the surface of a core which is a naturally occurring mica, synthetic mica, glass flake, alumina and transparent film with a metal oxide such as titanium oxide, and the like.

Any of the colorants listed above may be employed alone or in combination of two or more, and employed in an amount of 3 to 40% by weight based on an ink composition.

Furthermore, an inventive ink composition for a ballpoint pen may contain, as desired, a lubricant including a higher fatty acid such as oleic acid, a nonionic surfactant having a long chain alkyl group, a polyether-modified silicone oil, a triester thiophosphate such as tri(alkoxycarbonylmethylester) thiophosphate or tri(alkoxycarbonylethylester) and the like, and an excellent inhibitory effect on the wearing of a ball housing can be obtained especially when using a monophosphate of a polyoxyethylene alkyl ether or polyoxyethylene alkylaryl ether or a diphosphate of a polyoxyethylene alkyl ether or polyoxyethylene alkylaryl ether as well as a metal salt, ammonium salt, amine salt and alkanolamine salt thereof.

Moreover, an oil-based ink for a ballpoint pen described above may include the following resins as an additve for the purpose of inhibiting the blurring of a drawn line, improving the fixing performance and promoting the solidness.

Those exemplified typically are ketone resins, ketoneformaldehyde resins, amide resins, alkyd resins, rosin-modified resins, rosin-modified phenol resins, phenol resins, xylene resins, polyvinylpyrrolidone, α- and β-pynene/phenol condensate polymer resins, polyvinyl butyral resins, acryl resins and the like.

If desired, a wax such as carnauba wax, candelilla wax, rice wax, beeswax, ozokerite, ceresin, montan wax, montanic acid wax, montan ester wax and the like may also be added.

When applied to a ballpoint pen in which an ink composition described above is filled directly into an ink reservoir tube and the back end of the ink composition is provided with a ink follower protector, an air bubble, if any, in the ink leads to a gas aggregation as time elapses, resulting in an adverse effect on the ink supply upon writing, and an air bubble in the pen tip may lead to a disability of writing, and it is thus preferred to remove such an air bubble chemically by adding hydroxylamine or a salt thereof, a hydroxylamine derivative or a salt thereof, a reaction product of n-butylaldehyde and aniline, a derivative of a reaction product of n-butylaldehyde and aniline and the like.

Such a compound may for example be hydroxylamine, N-methylhydroxylamine, N,N-diethylhydroxylamine, N-(t-butylhydroxylamine, N-carbobenzoxyhydroxylamine, N,N-dibenzylhydroxylamine, N-benzoyl-N-phenylhydroxylamine, N-(benzyloxy)carbamic acid t-butyl ester, O-methylhydroxylamine, O-isobutylhydroxylamine, O-arylhydroxylamine, O-benzylhydroxylamine, N,O-dimethylhydroxylamine, N,N,O-triacetylhydroxylamine, N-methoxy-N-methylacetamide and n-butylaldehydeaniline.

An ink composition described above is filled in a ballpoint pen having a ballpoint-pen tip fitted in the drawing side end of the pen.

The structure of a ballpoint pen is described below (see FIGS. 1 to 6).

Figure 1:
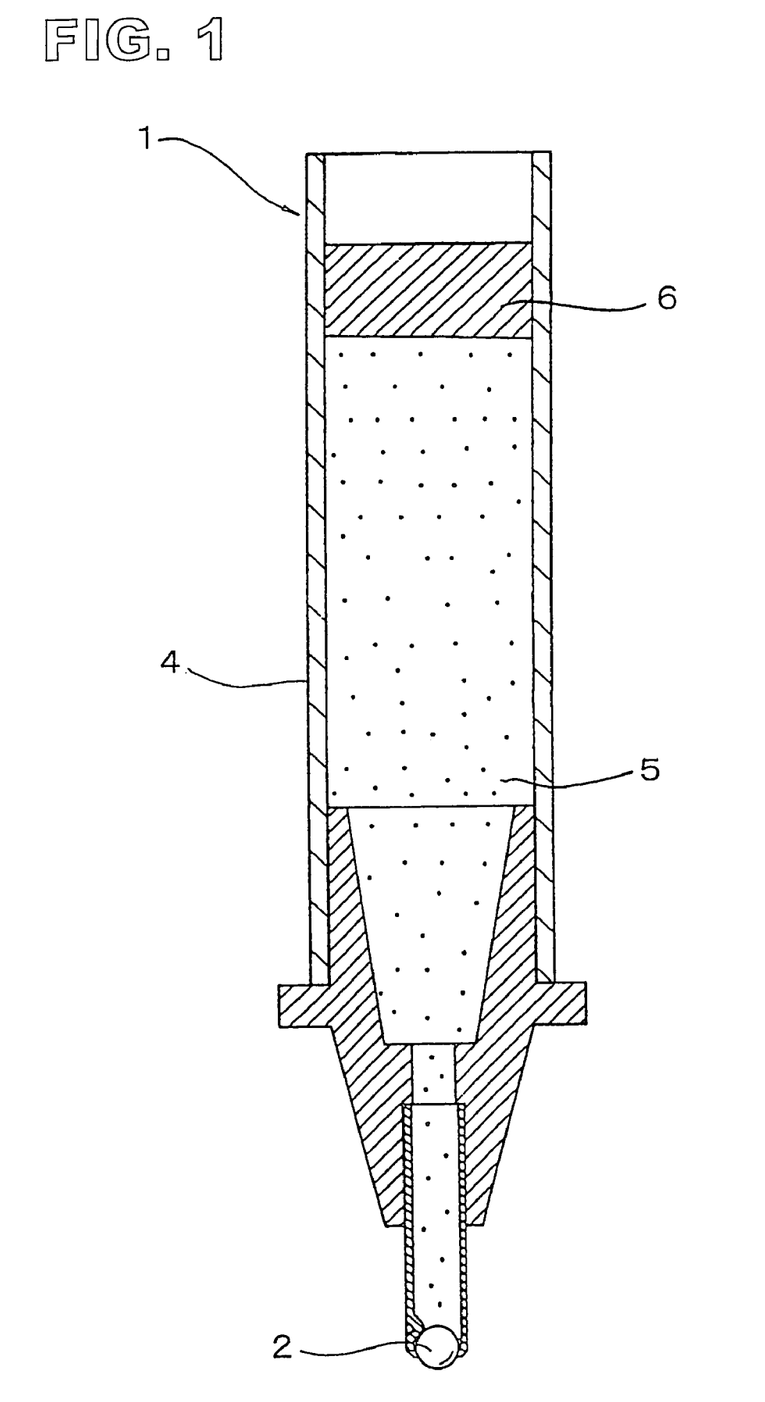
FIG. 1 is a referenced schematic view of one example of the ballpoint pen.
Figure 2:
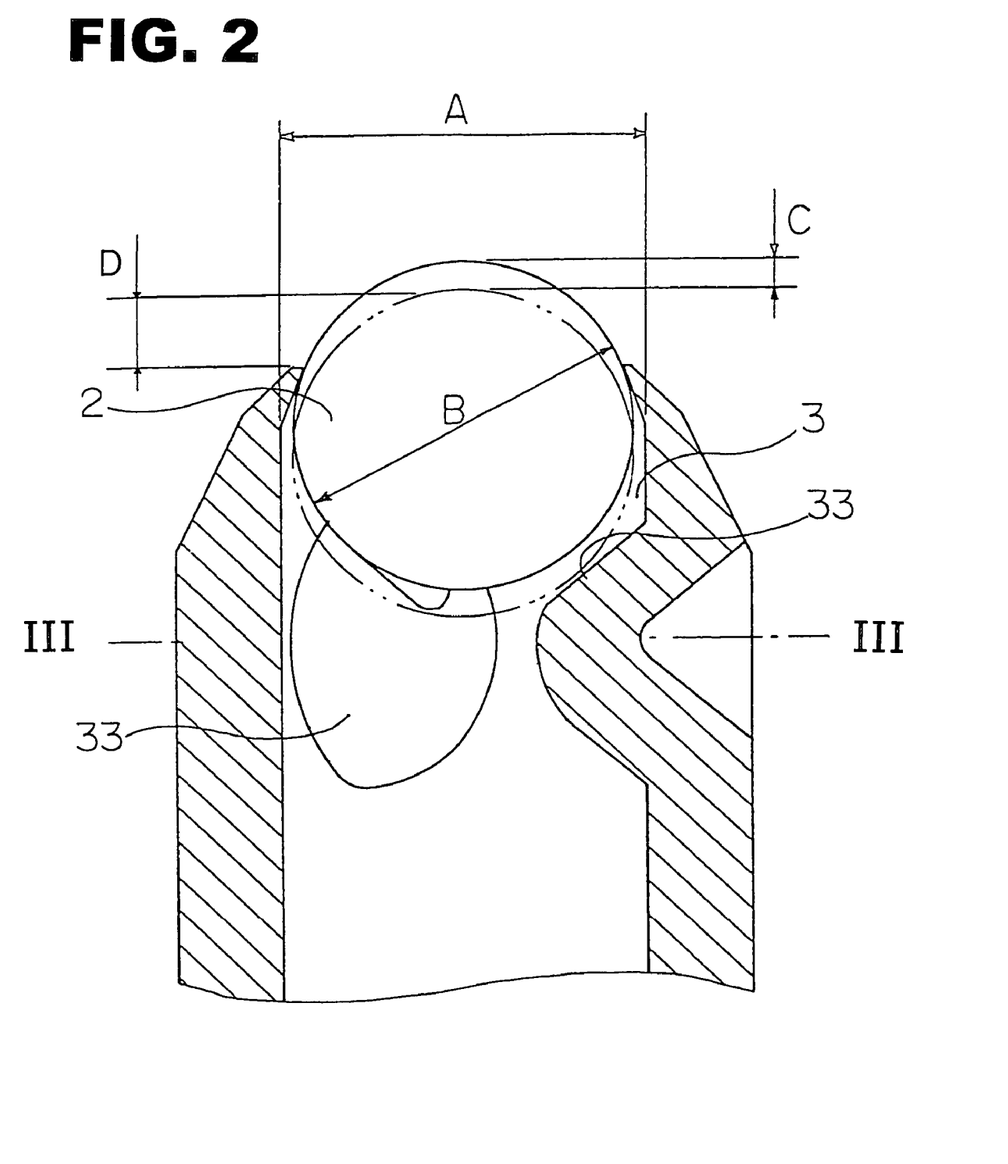
FIG. 2 is a referenced longitudinal sectional schematic view of the ballpoint-pen tip part of the ballpoint pen in FIG. 1.
Figure 3:
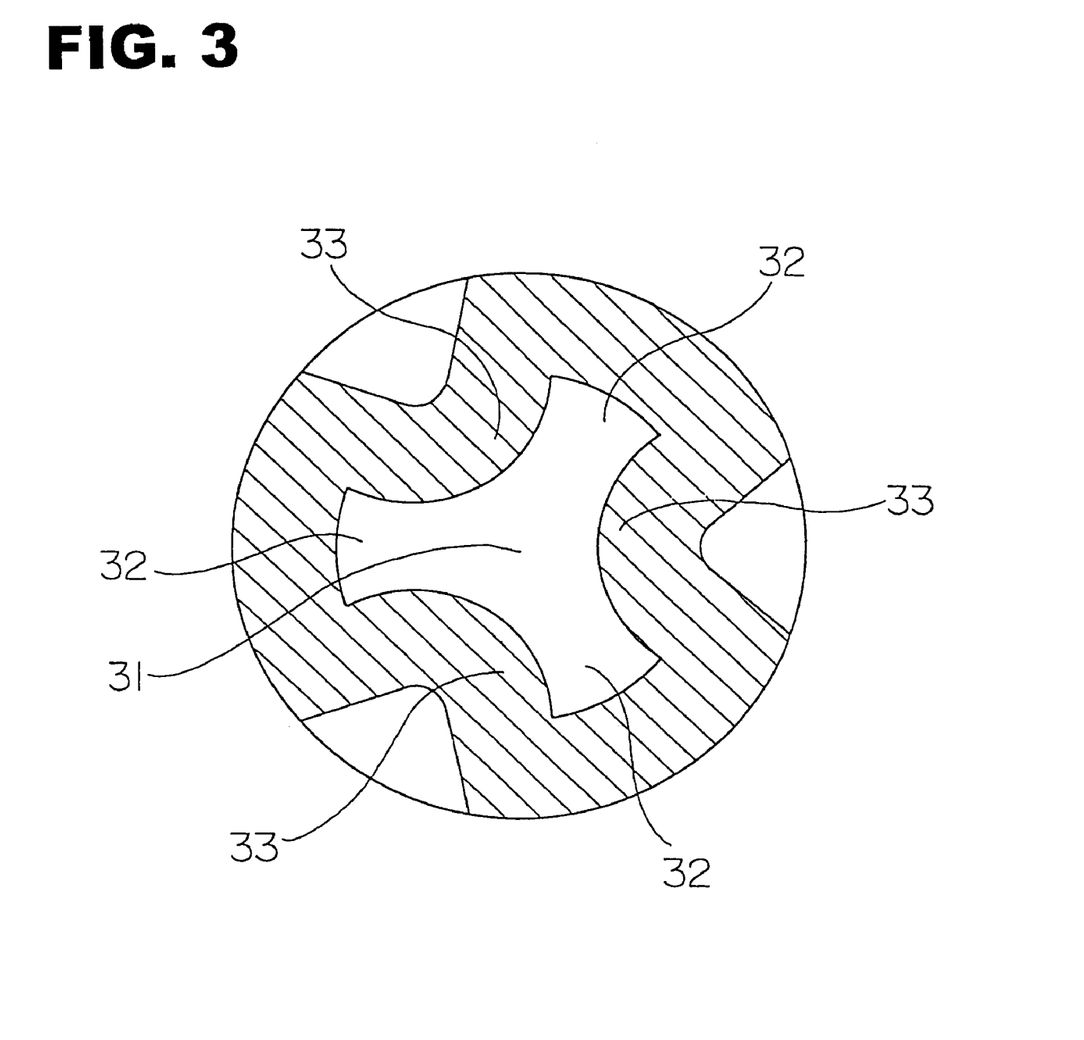
FIG. 3 is a referenced sectional view of FIG. 2 at III-III.
Figure 4:
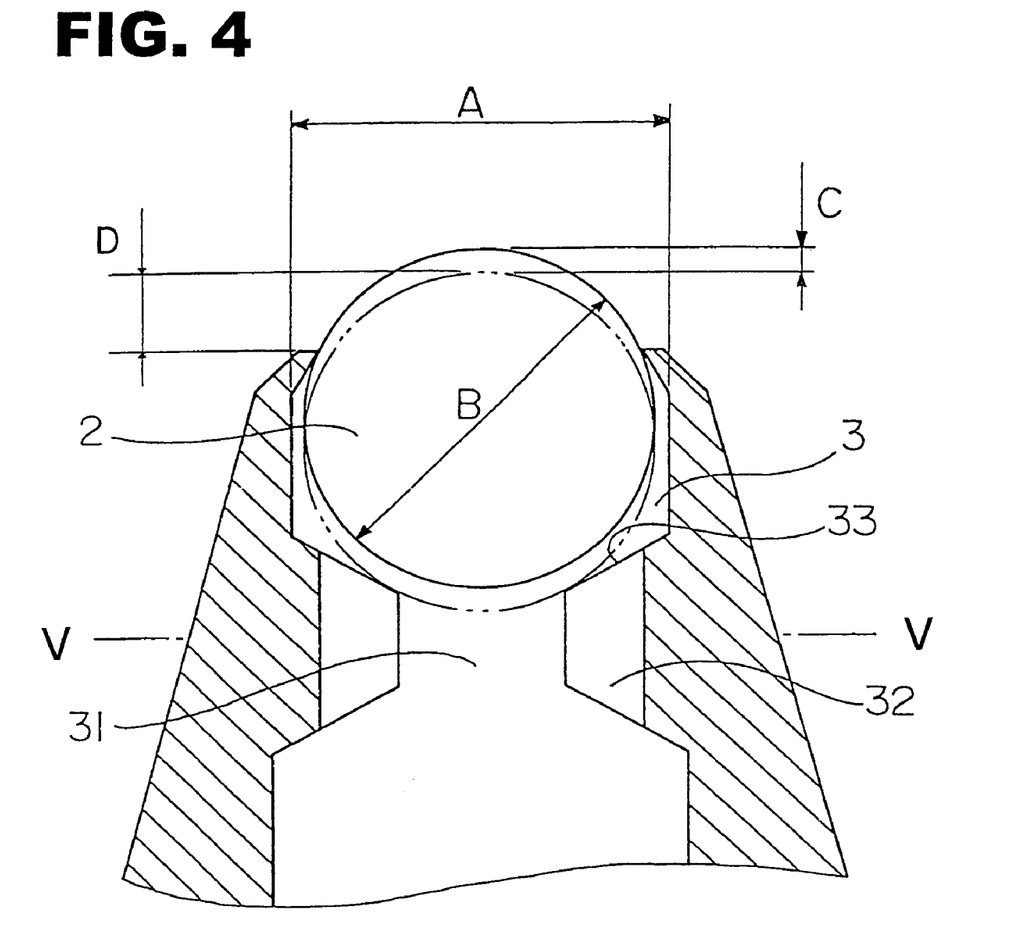
FIG. 4 is another referenced longitudinal sectional schematic view of the ballpoint-pen tip part of the ballpoint pen according to the present invention.
Figure 5:
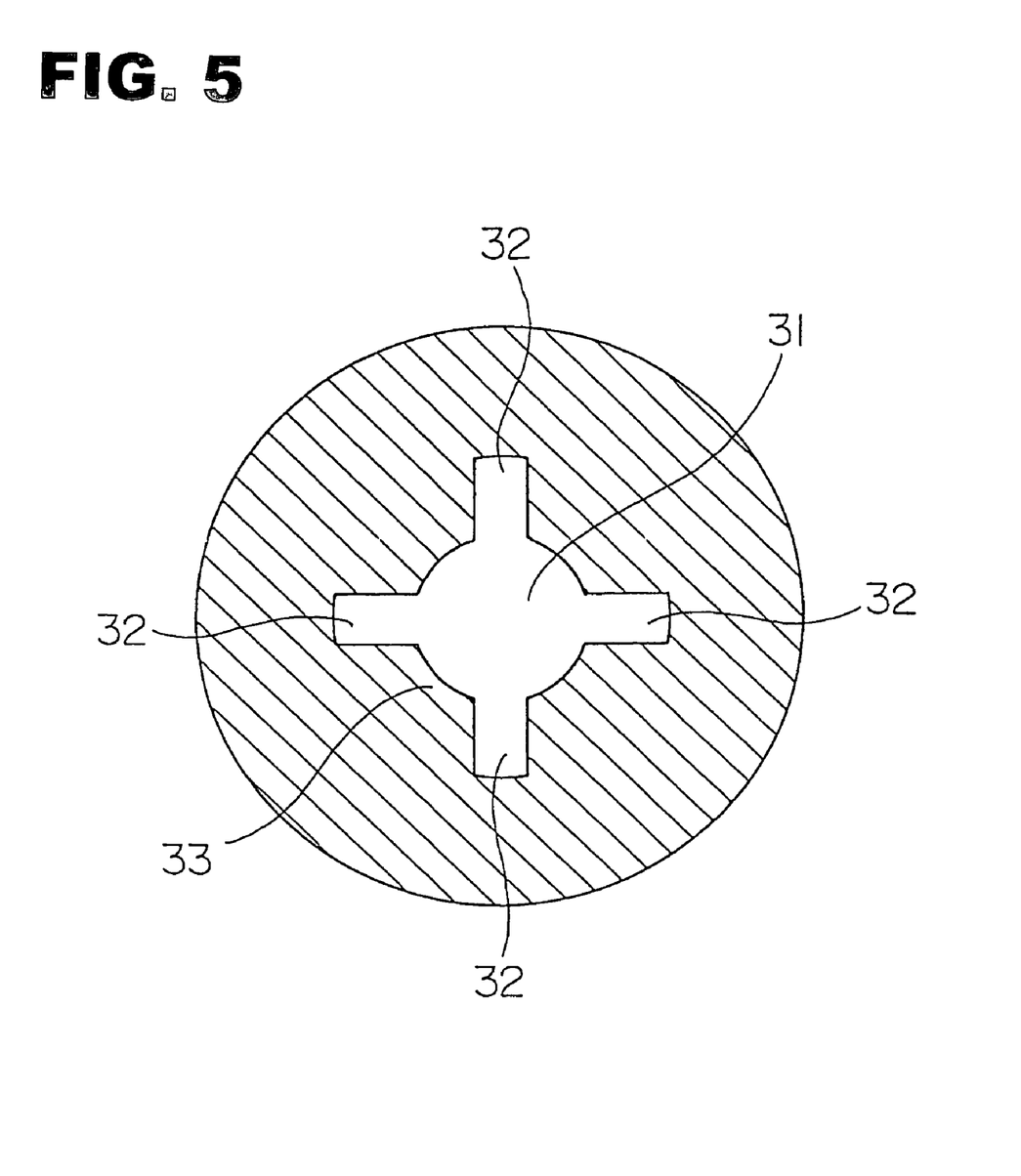
FIG. 5 is a referenced sectional view of FIG. 4 at V-V.
Figure 6:
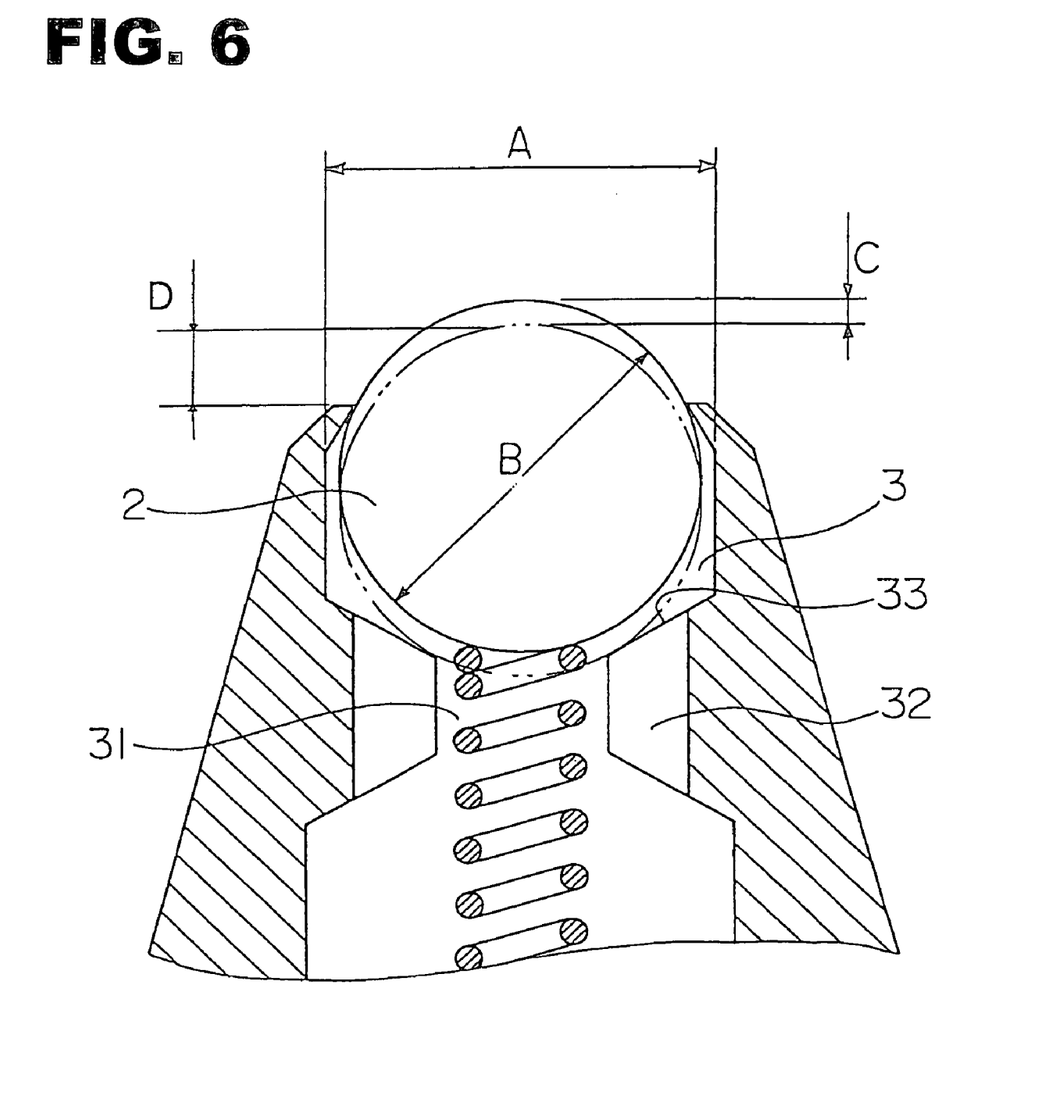
FIG. 6 is another referenced longitudinal sectional schematic view of the ballpoint-pen tip part of the ballpoint pen.

While the structure and the shape of a ballpoint pen is not limited particularly, it may be exemplified as ballpoint pen 1 having an ink reservoir tube 4 filled with ink composition 5 wherein said ink reservoir tube 4 is connected to a ballpoint-pen tip which holds ball 2 in its end and the end of ink composition 4 is brought into close contact with ink follower preventing body composition 6.

The structure of a ballpoint-pen tip may be of any conventional mechanism, such as a mechanism in which the metal pipe tip region is deformed by a force given externally toward the inside to form ball holder 3 which is allowed to hold ball 2 whereby forming a tip end provided with center hole 31, ink introducing hole 32 and ball housing 33 as an integrated unit (see FIGS. 2 and 3), a mechanism in which a metal material is subjected to a grinding process for example by using a drill and the like to form a tip and ball holder 3 is allowed to hold ball 2 whereby providing center hole 31, radial ink introducing hole 32 and ball housing 33 (see FIGS. 4 and 5), or a mechanism in which a ball is pressed forward using a spring (see FIG. 6), as well as a mechanism in which a ball housing made from a resin is provided inside of a tip made from a plastic.

More specifically, a ballpoint-pen tip described above preferably has a radial movable distance (A–B) of 3 to 15% of the outer ball diameter [100×(A–B)/outer ball diameter] and an axial movable distance (C) of 5 to 15% of the outer ball diameter [100×(C)/outer ball diameter] and its ball protrusion length (D) over the tip end in the state where the back of the ball is in contact with the ball housing provided in the tip is 20 to 29% of the outer ball diameter [100×(D)/outer ball diameter].

The conditions specified above are essential for enabling the drawing on the surfaces of various materials which are not only papers but also non-permeable material and fibrous material and also for enabling the formation of a satisfactorily drawn line, and ratios of the radial and axial movable distances of a ball to the outer ball diameter deviating from the ranges specified above results in a difficulty in controlling the flow rate of the ink composition appropriately, which leads to a blurred line or an excessive ink deposition on the drawing surface due to an excessive flow of the ink, thus posing a difficulty in drawing a satisfactory line.

A ratio of the ball protrusion length to the outer ball diameter deviating from the range specified above leads to a difficulty in achieving a smooth pen touch both on a non-permeable material and on a paper or fibrous material simultaneously.

Thus, a ratio of the ball protrusion length to the outer ball diameter less than 20% allows the tip end to be brought readily into a close contact with the surface to be drawn, which leads to a scratch, resulting in a difficulty in drawing smoothly.

A ratio exceeding 29% leads to a difficulty in exerting a function of introducing an ink via the gap (clearance) between the ball and the ballpoint-pen tip due to the close contact of the drawing surface with said gap, which is essential for drawing a line by allowing the ink to be introduced via the clearance between the ball and the ballpoint-pen tip whereby compensating any insufficient transference of the ink due to the inhibition of the smooth rotation of the ball by a non-permeable material if the drawing is made on such a material.

A ball mentioned above may be one made from a highly hard alloy, stainless steel, ruby, ceramic, resin, rubbers and the like whose diameter is 0.3 to 30.0 mm.

A pen filled with the present ink includes one provided with a rotation mechanism in the end of the drawing tip that allows a line to be drawn by means of a rotating action similar to that of a ball.

An ink reservoir tube containing an ink composition described above is a molded article made from a thermoplastic resin such as polyethylene, polypropylene, polyethylene terephthalate, nylons and the like.

By using a transparent, colored and transparent or semi-transparent molded article as an ink-reservoir tube described above, the color and the residual amount of the ink can be checked visually.

In addition to a direct connection of a tip to an ink reservoir tube described above, a connection via a connecting part may be employed between the ink reservoir tube and the tip.

An ink reservoir tube described above may be in the form of a refill to be housed in the pen cylinder, and the cylinder fitted with a tip in its end may itself be employed as an ink reservoir tube in which an ink is filled directly into the inside of the cylinder.

The back end of an ink composition contained in an ink reservoir tube described above is charged with an ink follower preventing body.

An ink follower preventing body composition described above consists of a non-volatile liquid or a sparingly volatile liquid.

Those exemplified typically are petrolatum, spindle oil, castor oil, olive oil, purified mineral oil, liquid paraffin, polybutene, α-olefin, α-olefin oligomer or cooligomer, dimethyl silicone oil, methylphenyl silicone oil, amino-modified silicone oil, polyether-modified silicone oil, fatty acid-modified silicone oil and the like, any of which can be employed alone or in combination of two or more.

A non-volatile liquid and/or sparingly volatile liquid mentioned above is preferably increased to a suitable viscosity by adding a gelling agent, which may for example be a surface-hydrophobically-treated silica, surface-methylated microparticle silica, aluminium silicate, swelling mica, a clay-based thickening agent such as a hydrophobically treated bentonite or montmorillonite, metal soaps of fatty acids such as magnesium stearate, calcium stearate, aluminium stearate, zinc stearate and the like, tribenzylidene sorbitol, fatty acid amide, amide-modified polyethylene wax, hydrogenated castor oil, a dextrin-based compound such as a fatty acid dextrin and a cellulose-based compound.

It is also possible to use a liquid ink follower preventing body composition and a solid ink follower preventing body simultaneously.

BRIEF DESCRTION OF THE DRAWNGS

DESCRIPTION OF THE PREFERRED EMBODIMENTS

An ink composition for a ballpoint pen according to the present invention is prepared, in the case that the colorant is a dye, by adding the dye to an organic solvent solution in which a shear-viscosity reducing agent has previously been dissolved or dispersed if necessary together with resins and various additives followed by stirring and dissolving.

It is prepared, in the case that the colorant is a pigment, by adding resins and various additives as desired to an organic solvent solution in which a shear-viscosity reducing agent has previously been dissolved or dispersed, stirring and dissolving, and then adding a dispersion formed previously by dispersing the pigment in a solvent prepared separately, and then stirring.

EXAMPLES

The compositions of the inks of EXAMPLES and COMPARTIVES are shown in Table. The compositions are represented by parts by weight.

TABLE 1

| Starting materials | Remarks | EXAMPLES | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| Black dye | (1) | 10.0 | 10.0 | | | | | | 10.0 | 10.0 | 10.0 |
| Blue dye | (2) | | | 10.0 | | | | | | | |
| Red dye | (3) | | | | 8.0 | | | | | | |
| Carbon black | (4) | | | | | 6.0 | | | | | |
| Metal powder pigment | (4) | | | | | | 6.0 | | | | |
| Pink fluorescent pigment | (5) | | | | | | | 10.0 | | | |
| Shear-viscosity reducing agent A | (6) | 1.7 | 1.2 | | 1.0 | | 1.9 | | | | |
| Shear-viscosity reducing agent B | (7) | | | 2.0 | | | | | | | |
| Shear-viscosity reducing agent C | (8) | | | | | 5.0 | | 15.0 | 7.0 | | |
| Shear-viscosity reducing agent D | (9) | | | | | | | | | 8.0 | |

TABLE 1-continued

| Starting materials | Remarks | \_\_\_\_\_\_\_\_\_\_\_\_\_\_\_\_\_\_\_\_\_\_\_\_\_\_\_\_ EXAMPLES \_\_\_\_\_\_\_\_\_\_\_\_\_\_\_\_\_\_\_\_\_\_\_\_\_\_\_\_ | | | | | | | | | |
|---|---|---|---|---|---|---|---|---|---|---|---|
| | | 1 | 2 | 3 | 4 | 5 | 6 | 7 | 8 | 9 | 10 |
| Shear-viscosity reducing agent E | (10) | | | | | | | | | | 7.0 |
| Phenol resin | (11) | 7.0 | | | 15.0 | | 12.0 | | | | |
| Ketone-formaldehyde resin | (12) | | 15.0 | 15.0 | | | | | 5.5 | 10.0 | 7.0 |
| Polyvinylbutyral | (13) | | | | | 16.0 | | | | | |
| Polyvinylpyrrolidone | (14) | | | | | 4.0 | | | | | |
| Acrylic resin | (15) | | | | | | | 9.0 | | | |
| Polyoxyethylene alkyl ether phosphate | (16) | 5.0 | 5.0 | 1.0 | 2.0 | | 2.0 | 2.0 | 5.0 | 5.0 | 5.0 |
| Polyoxyethylene-modified silicone | (17) | 0.3 | 0.3 | | 0.3 | | | | 0.3 | 0.3 | |
| Polyoxyethylene alkylamine | (18) | | | | | 1.5 | 2.0 | 5.0 | | | |
| Ethyl alcohol | | 10.0 | | | | | | 59.0 | | | |
| n-Propyl alcohol | | | 58.5 | 72.0 | | 57.2 | 76.1 | | 62.2 | 56.7 | |
| Isopropyl alcohol | | | | | 74.0 | | | | | | |
| Propylene glycol monomethylether | | 66.0 | | | | | | | | | 61.0 |
| Methyl lactate | | | 10.0 | | 10.0 | | | | 10.0 | 10.0 | 10.0 |
| Viscosity (3.84 $S^{-1}$) mPa · s | | 422 | 256 | 1331 | 218 | 243 | 1523 | 1280 | 120 | 166 | 122 |
| Shear-viscosity reduction index (n) | | 0.60 | 0.73 | 0.28 | 0.71 | 0.76 | 0.55 | 0.62 | 0.86 | 0.85 | 0.93 |

TABLE 2

| Starting materials | Remarks | \_\_\_\_\_\_\_\_\_\_ COMPARATIVES \_\_\_\_\_\_\_\_\_\_ | | | | | |
|---|---|---|---|---|---|---|---|
| | | 1 | 2 | 3 | 4 | 5 | 6 |
| Black dye | (1) | 10.0 | 20.0 | | | | |
| Blue dye | (2) | | | 15.0 | | | |
| Carbon black | | | | | 6.0 | | |
| Metal powder pigment | (4) | | | | | 6.0 | |
| Pink fluorescent pigment | (5) | | | | | | 10.0 |
| Shear-viscosity reducing agent A | (6) | | 1.0 | | | | |
| Phenol resin | (11) | 5.0 | 10.0 | | | 44.0 | |
| Ketone-formaldehyde resin | (12) | | | 30.0 | 20.0 | | |
| Polyvinylbutyral | (13) | | | | 6.0 | | |
| Polyvinylpyrrolidone | (14) | | | 3.0 | | | |
| Acrylic resin | (15) | | | | | | 14.0 |
| Polyoxyethylene alkyl ether phosphate | (16) | 5.0 | 2.0 | | 2.0 | 2.0 | 1.0 |
| Polyoxyethylene-modified silicone | (17) | 0.3 | | | | | |
| Polyoxyethylene alkylamine | (18) | | | | | 2.0 | |
| Oleic acid | (19) | | 2.0 | 2.0 | | | |
| Ethyl alcohol | | | | | | | 75.0 |
| n-Propyl alcohol | | 69.7 | | | | 46.0 | |
| Isopropyl alcohol | | | | | 66.0 | | |
| Ethylene glycol monophenyl ether | | | 55.0 | 40.0 | | | |
| Benzyl alcohol | | | 10.0 | 10.0 | | | |
| Methyl lactate | | 10.0 | | | | | |
| Viscosity (3.84 $S^{-1}$) mPa · s | | 7.8 | 5400 | 18000 | 269 | 601 | 78 |
| Shear-viscosity reduction index (n) | | 0.98 | 0.83 | 0.99 | 0.90 | 0.67 | 0.87 |

The starting materials shown in Table are described below in the order of the designated number.

(1) C.I. Solvent Black 7 [ORIENT CHEMICAL INDUSTRIES, LTD., trade name: Nigrosine BASE EX]

(2) C.I. Solvent Blue 5 [ORIENT CHEMICAL INDUSTRIES, LTD., trade name: OIL BLUE 613]

(3) C.I. Basic Red 1 [HODOGAYA CHEMICAL CO., LTD., trade name: SPIRON RED CGH, organic acid salt of dye]

(4) Aluminium powder mineral spirit dispersion [TOYO ALUMINIUM K.K., trade name: Alpaste 65-066, % Solid: 66%]

(5) Sterling UK, trade name: FLARE F210P (6) Crosslinked N-vinyl carboxylic acid amide copolymer [NIPPON JUNYAKU CO., LTD., trade name: RHEOGIC GX 20

(7) Fatty acid amide wax benzyl alcohol dispersion [KYOEICO., LTD., trade name: TARLEN BA600, % Solid: 32%]

(8) Alkaline crosslinked acrylic resin (emulsion) [Clariant Polymer, trade name: Viscalex HV-30, % Solid: 30%]

(9) SHIN NAKAMURA CHEMICAL CO., LTD., trade name: 900W [Emulsion (40% solid) of acrylic copolymers including polymer units of Formula (1) and (2) (wherein R1 is $CH_3$ and $R_2$ is $C_4H_9$ as main component]

(10) Rohm & Haas Company, trade name: ASE60 [emulsion (30% solid) of copolymer of methacrylic acid and acrylate]

(11) ARAKAWA CHEMICAL INDUSTRIES, LTD., trade name: TAMANOL 510

(12) Huls Germany, trade name: SYNTHETIC RESIN SK (13) SEKISUI KAGAKU KOGYO, trade name: Slec BL-1

(14) BASF Germany, trade name: LUBISCOL K-30

(15) JOHNSON POLYMER, trade name: JONCRYL 682

(16) DAI-ICHI KOGYO SEIYAKU CO., LTD., trade name: PRISURF A 207H, mixture of polyoxyethylene alkyl ether monophosphate and polyoxyethylene alkyl ether diphosphate (17) SHINETSU KAGAKU KOGYO, trade name: Silicone KF-615A (18) LION AKZO CO., LTD., trade name: ETHOMEEN C25

(19) Kao Corporation, trade name: LUNAC O—P

The ink of each of EXAMPLES and COMPARATIVE was prepared by an ink preparation method as described above, and subjected to the following tests. In the drawing test, an ink described above which had been filled into a ballpoint pen having a stainless steel tip holding a ball 0.7 mm in diameter engaged with one end of a polypropylene pipe was employed.

While a ball 0.7 mm in diameter was employed in EXAMPLES, a stainless steel tip holding a ball whose diameter is 0.3 to 30.0 mm can be employed as desired.

A: Drawn Line Drying Test

Each ink was applied onto a polypropylene film using a 20 mil bar coater at ambient temperature and humidity, and then the time required for drying the applied coating was measured.

B: Drawing Test on Non-Permeable Material

Using each ballpoint pen verified to write normally, a line was drawn on a glass and a polyproplyene film.

C: Drawing Test on Fibrous Material

Using each ballpoint pen verified to write normally, a line was drawn on a cotton fabric.

D: Cap Off Test

Each ballpoint pen verified to write normally was allowed to stand at ambient temperature and humidity for 7 days, and then a line was drawn on a paper.

E: Ink Stability Test

Each ink in a certain amount was filled in a transparent glass bottle, allowed to stand for 30 days at 50° C., and then examined for the ink state microscopically.

The results of the tests described above are shown below.

TABLE 3

| Test items | EXAMPLES | | | | | | | | | |
|---|---|---|---|---|---|---|---|---|---|---|
| | 1 | 2 | 3 | 4 | 5 | 6 | 7 | 8 | 9 | 10 |
| A: Drawn line drying test | ○ | ◎ | ◎ | ◎ | ◎ | ◎ | ◎ | ◎ | ◎ | ◎ |
| B: Drawing test on non-permeable material | ○ | ○ | ○ | ○ | ○ | ○ | ○ | ○ | ○ | ○ |
| C: Drawing test on fibrous material | ◎ | ◎ | ○ | ◎ | ◎ | ◎ | ◎ | ○ | ◎ | ○ |
| D: Cap off test | ◎ | ◎ | ◎ | ◎ | ◎ | ◎ | ○ | ◎ | ◎ | ◎ |
| E: Ink stability test | ○ | ○ | ○ | ○ | ○ | ○ | ○ | ○ | ○ | ○ |

TABLE 4

| Test items | COMPARATIVES | | | | | |
|---|---|---|---|---|---|---|
| | 1 | 2 | 3 | 4 | 5 | 6 |
| A: Drawn line drying test | ◎ | X | X | ○ | Δ | ◎ |
| B: Drawing test on non-permeable material | ○ | X | X | X | Δ | ○ |
| C: Drawing test on fibrous material | X | ◎ | ◎ | ◎ | ◎ | X |
| D: Cap off test | ◎ | ◎ | ◎ | X | X | Δ |
| E: Ink stability test | ○ | ○ | ○ | Δ | X | X |

The evaluation criteria of the results shown in Tables are as described below.

A: Drawn line drying test
◎: The drawn line is dried within a period less than 3 minutes.
○: The drawn line is dried within a period of 3 minutes or longer and less than 5 minutes.
Δ: The drawn line is dried within a period of 5 minutes or longer and less than 10 minutes.
X: The drawn line is not dried even after 10 minutes.

B: Drawing test on non-permeable material
○: A line can be drawn on a glass and a polypropylene film.
Δ: A line can be drawn on a polypropylene film but not on a glass.
X: A line can not be drawn on a glass or on a polypropylene film.

C: Drawing test on fibrous material
◎: There is no difference in the line width between immediately after drawing and after allowing to stand.
○: When compared with the line width immediately after drawing, the line width after allowing to stand is increased slightly (less than 120% based on the initial line width).
Δ: When compared with the line width immediately after drawing, the line width after allowing to stand is increased (120% or more and less than 150% based on the initial line width).
X: When compared with the line width immediately after drawing, the line width after allowing to stand is increased markedly (150% or more based on the initial line width).

D: Cap off test
◎: The blurring disappears in the drawing less than 10 mm.
○: The blurring disappears in the drawing of 10 mm or more and less than 50 mm.
Δ: The blurring disappears in the drawing of 50 mm or more and less than 200 mm.
X: The blurring does not disappear even in the drawing of 200 mm or more.

E: Ink stability test
○: No change from initial state.
Δ: Slight precipitation on bottom.
X: Markedly clear layer on top or substantial precipitation on bottom.

In the present invention, by containing an organic solvent as a main solvent whose vapor pressure is 5.0 to 50 mmHg (20° C.) and a shear-viscosity reducing agent, a ink composition for a ballpoint pen capable of drawing a satisfactory line on the surfaces of various materials can be provided.

What is claimed is:

1. An oil-based ballpoint-pen ink composition comprising at least a colorant, a solvent consisting essentially of an organic solvent, and a shear-viscosity reducing agent, wherein said organic solvent comprises not less than 50% by weight of an organic solvent having a vapor pressure of about 665 to 6650 Pa (5.0 to 50 mmHg) and being one or more solvents selected from the group consisting of aliphatic monohydric alcohols, and wherein said shear-viscocity reducing agent is selected from non-crosslinked acrylic copolymers of acrylic acid or methacrylic acid with acrylates represented by Formula (3) or methacrylates represented by Formula (4):

(Formula 3)

wherein $R_1$ is an alkyl group having 1 to 12 carbon atoms (Formula 4)

wherein $R_2$ is an alkyl group having 1 to 12 carbon atoms, and wherein the ink viscosity at the shear speed of 3.84 s$^{-1}$ is not less than about 10 mPa·s (20° C.) and the shear-viscosity reduction index is about 0.3 to 0.99.

2. The oil-based ballpoint-pen ink composition according to claim 1 wherein said organic solvent having the vapor pressure of about 665 to 6650 Pa (5.0 to 50 mmHg) is selected from the group consisting of n-propyl alcohol, isopropyl alcohol and ethyl alcohol.

3. The oil-based ballpoint-pen ink composition according to claim 1 wherein the shear-viscosity reduction index is about 0.5 to 0.99.

* * * * *